(No Model.)
ALEJANDRO GUAL Y S. JUAN.
PHOTOGRAPHIC CAMERA.
No. 557,801. Patented Apr. 7, 1896.
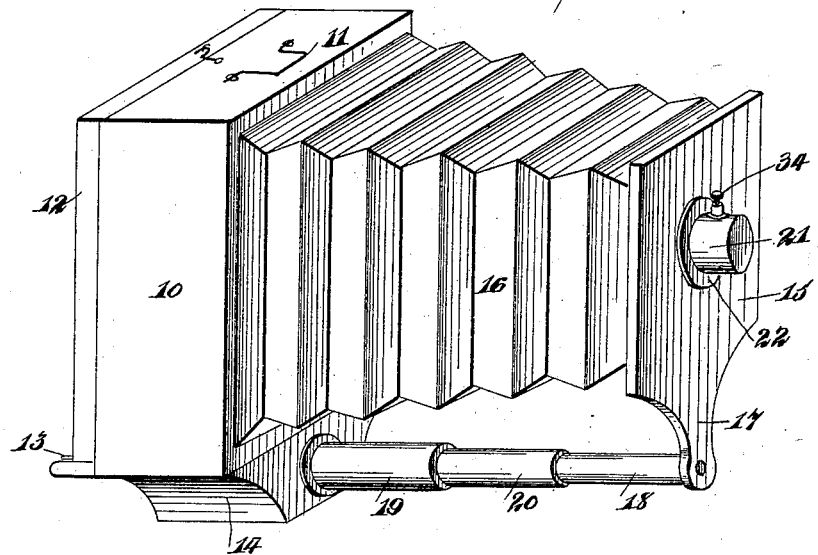
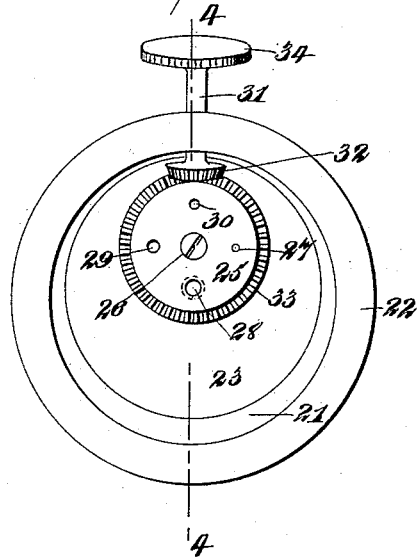
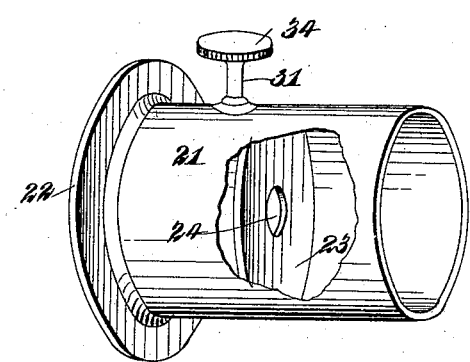
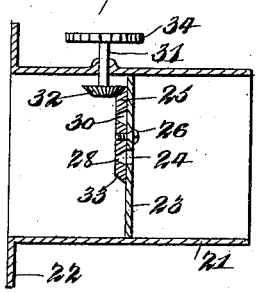
WITNESSES:
H. Walker
John Lotka
INVENTOR
A. Gual y S. Juan
BY
Munn & Co
ATTORNEYS.

UNITED STATES PATENT OFFICE.

ALEJANDRO GUAL Y S. JUAN, OF HAVANA, CUBA.

PHOTOGRAPHIC CAMERA.

SPECIFICATION forming part of Letters Patent No. 557,801, dated April 7, 1896.

Application filed October 16, 1895. Serial No. 565,834. (No model.)

*To all whom it may concern:*

Be it known that I, ALEJANDRO GUAL Y SN JUAN, residing at Havana, Cuba, have invented certain new and useful Improvements in Photographic Cameras, of which the following is a full, clear, and exact description.

My invention relates to photographic cameras, and has for its object to provide an improved objective which will be compact and light-tight and free from projecting parts, so as to decrease its liability to injury.

The particular construction and arrangement of parts whereby the above objects are attained will be fully described hereinafter, and defined in the appended claims.

Reference is to be had to the accompanying drawings, forming a part of this specification, and illustrating a camera constructed according to my invention, and in which—

Figure 1 is a perspective view of the camera in its extended position. Fig. 2 is a perspective view of the improved objective as seen from its inner end. Fig. 3 is a perspective view of the objective as seen from the side with part of the objective-tube broken away, and Fig. 4 is a sectional elevation thereof on line 4 4 of Fig. 2.

Like reference characters denote like parts in all the views.

The camera is provided with a box or back 10, which may be of any approved construction, and as shown has a handle 11 attached to it and also a ground-glass frame 12, which is hinged at the bottom, as indicated at 13. The back 10 has a downward extension or base-piece 14, adapted to be secured on a tripod or other support. The camera further comprises a front 15, connected to the back 10 by means of the bellows 16 and provided with a downward extension 17, projecting into the plane of the base-piece 14. As an additional means of connecting the back 10 to the front 15 I have provided a telescopic brace consisting of a front section 18, secured to the extension 17 of the front, a rear section 19, secured to the base-piece 14, and a central section 20, having a sliding connection with each of the end sections. This telescopic brace, as shown in the drawings, is arranged in a plane above the bottom of the base-piece 14, so that it will not interfere with the movement of the front 15 and of the bellows 16, as it cannot come in contact with any surface or support on which the camera may be placed. Another advantage of the particular construction of the said brace is that the central section 20 may be secured directly to the tripod or other support, and in this case either the front or the back may be adjusted independently in relation to the support.

To the front 15 is secured the objective, which consists of an objective-tube 21, having a flange 22 to facilitate its attachment to the front. The objective shown in the drawings has no lens, but is provided with a transverse partition 23, having a central aperture 24 for the passage of the light, the camera therefore being of the class known as "pin-hole" cameras. It will be understood, however, that my invention is not limited to such cameras.

The partition 23 fits tightly into the objective-tube 21, and on one side of said partition, preferably on its inner side, a sight-plate 25 is mounted to turn on a pivot 26, located eccentrically to the aperture 24. The sight-plate 25 is provided with a series of graduated holes 27, 28, 29, and 30, its object being to regulate the amount of light admitted and the time of exposure in substantially the same manner as the well-known revolving stops or diaphragms. The sight-plate, however, does not project through the objective-tube, but is located and revolves entirely within the same.

It is well known that the rotating stops above referred to project through a slit of the objective-tube, and the advantage of my novel arrangement is that the sight-plate or diaphragm is protected from injury by being entirely inclosed within the objective-tube, and the objective is more readily handled and packed than when the diaphragm protrudes outwardly from the objective-tube. Furthermore, the construction is very compact and light.

Another very important advantage of the new construction is that it insures a light-tight condition of the objective, which is difficult to obtain and particularly to preserve when the diaphragm moves in a slit of the objective-tube. Thus all danger of fogging the plates or films by light entering the objective through the slit in which the diaphragm moves is effectively avoided.

It will be understood that the usual precautions are taken to prevent reflections within the objective, the tube, partition, and sight-plate being preferably covered with lamp-black for this purpose.

It will also be observed that the partition 23 extends across the entire width of the objective-tube 21 and that a portion of the tube projects in advance of the partition, thus forming a hood to exclude direct rays of sunlight.

The opening through which light enters at the front end of the tube is larger than the diameter of the sight-plate.

It will be understood that the graduated holes 27, 28, 29, and 30 are arranged concentrically in relation to the pivot 26, so that by rotating the sight-plate 25 any one of the said openings can be brought into central alinement with the aperture 24. As a means for rotating the sight-plate I have shown a small headed shaft 31, which extends transversely through the objective-tube at the rear of the partition 23 and is provided within said tube with a bevel-pinion 32, engaging bevel-teeth 33 at the periphery of the sight-plate 25. The milled head 34 of the shaft 31 may be readily turned by the thumb and finger.

I prefer to make the holes 27, 28, 29, and 30 conical, their large outer ends being all substantially of the same size as the aperture 24, while their small inner ends are of different diameters, as shown in Fig. 2. In this manner the light will be properly directed in its passage through the aperture 24 and the holes of the sight-plate.

By providing in a pin-hole camera a series of apertures of different sizes the time of exposure may be varied in the same manner as in a lens-camera, and the focusing may be readily made with the aid of the aperture yielding the clearest or best visible image, while the exposure may be made with a different-sized aperture.

Having thus described my invention, I claim as new and desire to secure by Letters Patent—

1. The combination of the objective-tube, a centrally-apertured transverse partition extending entirely across the tube at a distance from the end thereof, so that the tube will project in front of the partition to exclude direct sunlight, a sight-plate located adjacent to the said partition and provided with a plurality of holes adapted to register with the said central aperture, the sight-plate being mounted to revolve entirely within the tube, having the central aperture, and means projecting from without the tube to the sight-plate therein, to turn the latter, substantially as described.

2. A photographic objective, comprising an objective-tube having an aperture for the passage of the light, and a sight-plate mounted to revolve adjacent to the said aperture and about an axis arranged eccentrically in relation to said aperture, the sight-plate having a plurality of tapering holes, which at the ends adjacent to the aperture are of substantially the same diameter as the aperture, while at their other ends they have different diameters, substantially as described.

ALEJANDRO GUAL Y S. JUAN.

Witnesses:
PEDRO BUSBELLO,
ERNESTO LA TOSCA.